Figure 1:
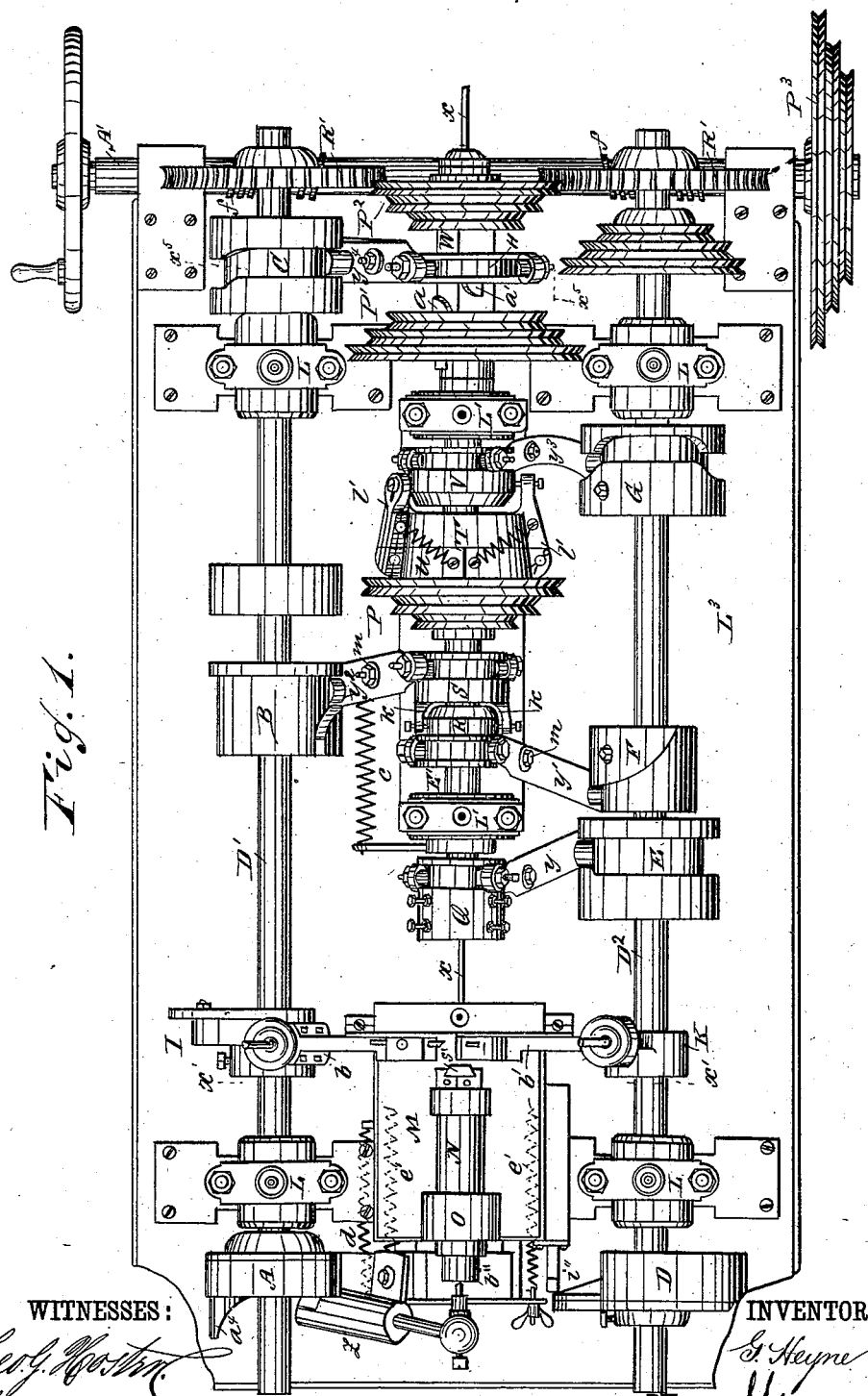

(No Model.)

G. HEYNE.
SCREW MACHINE.

No. 289,655. Patented Dec. 4, 1883.

WITNESSES:
Theo. J. Hostin
C. Sedgwick

INVENTOR:
G. Heyne
BY Munn & Co.
ATTORNEYS.

(No Model.) 5 Sheets—Sheet 2.
G. HEYNE.
SCREW MACHINE.
No. 289,655. Patented Dec. 4, 1883.
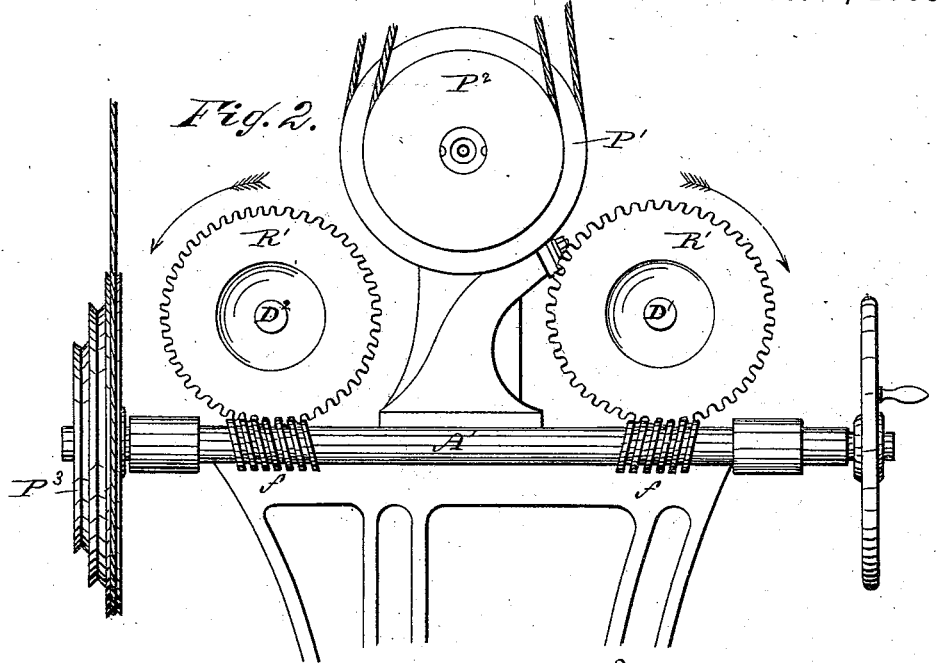
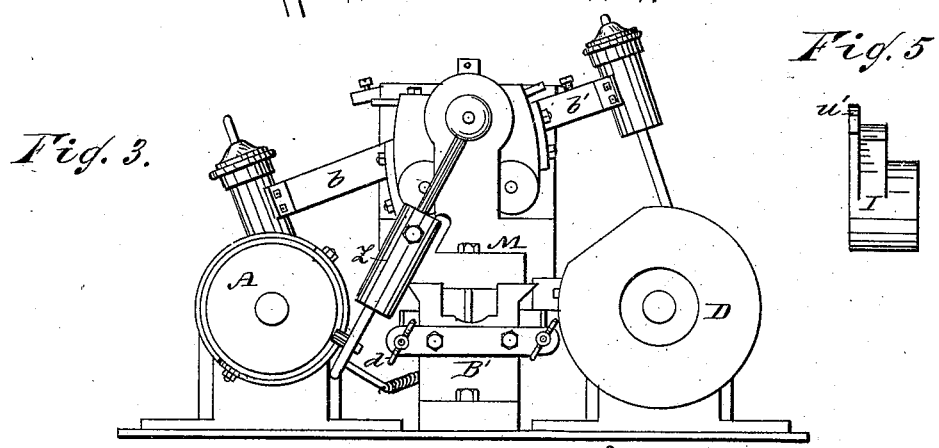
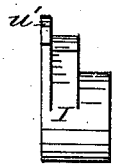
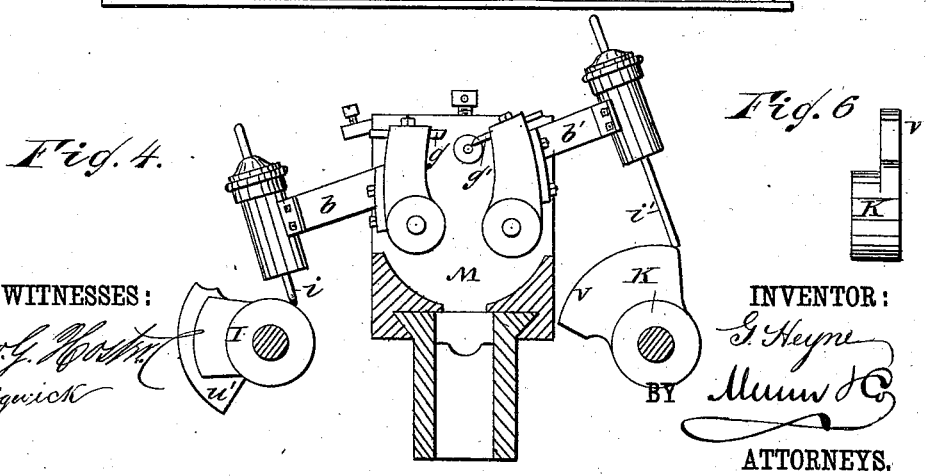
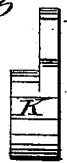
WITNESSES:
INVENTOR:
G. Heyne
BY Munn & Co.
ATTORNEYS.

(No Model.)  
5 Sheets—Sheet 3.
G. HEYNE.
SCREW MACHINE.
No. 289,655.  
Patented Dec. 4, 1883.
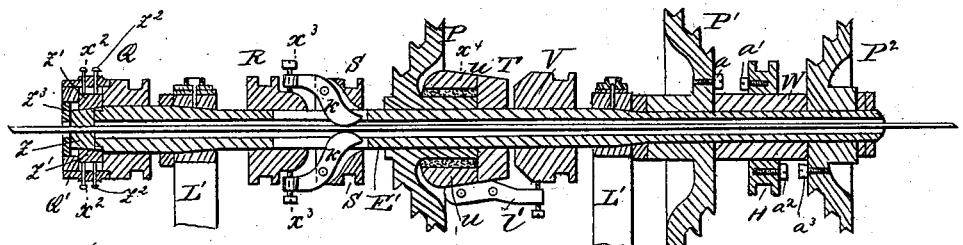
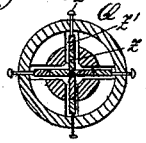
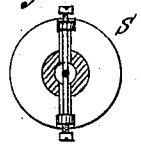
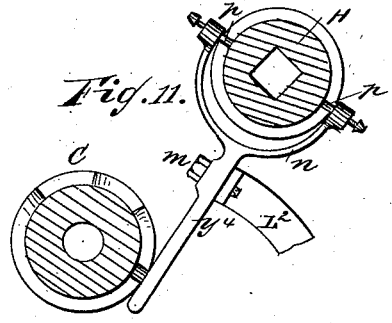
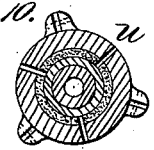
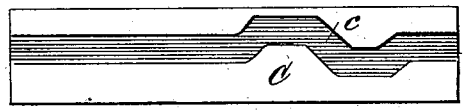
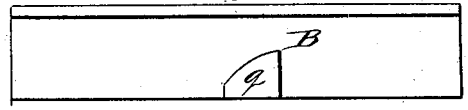
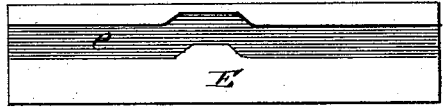
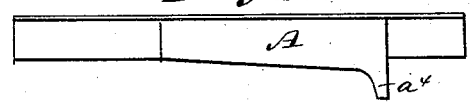
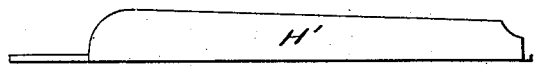
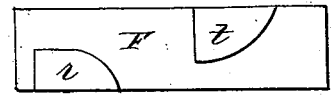
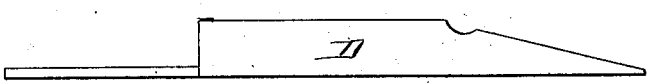
WITNESSES:  
Theo. G. Hoster  
C. Sedgwick
INVENTOR:  
G. Heyne  
BY Munn & Co.  
ATTORNEYS.

(No Model.) 5 Sheets—Sheet 4.
G. HEYNE.
SCREW MACHINE.
No. 289,655. Patented Dec. 4, 1883.
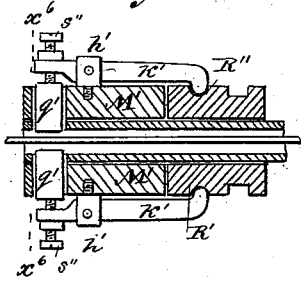
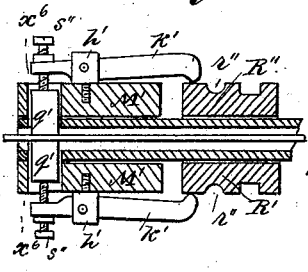
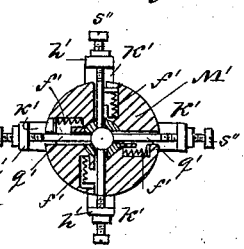
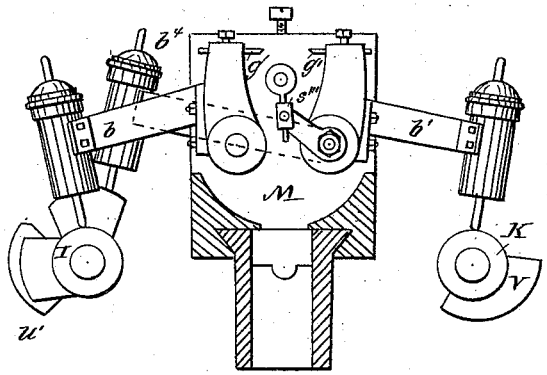
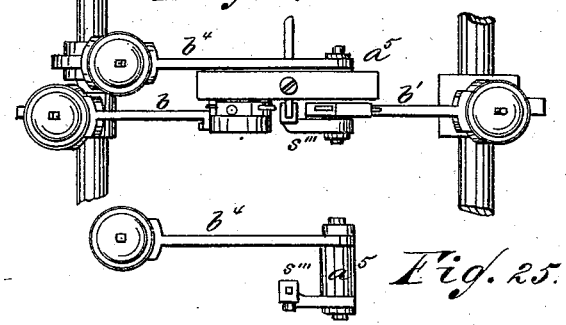
WITNESSES: INVENTOR:

(No Model.) 5 Sheets—Sheet 5.
G. HEYNE.
SCREW MACHINE.
No. 289,655. Patented Dec. 4, 1883.
Fig. 26.
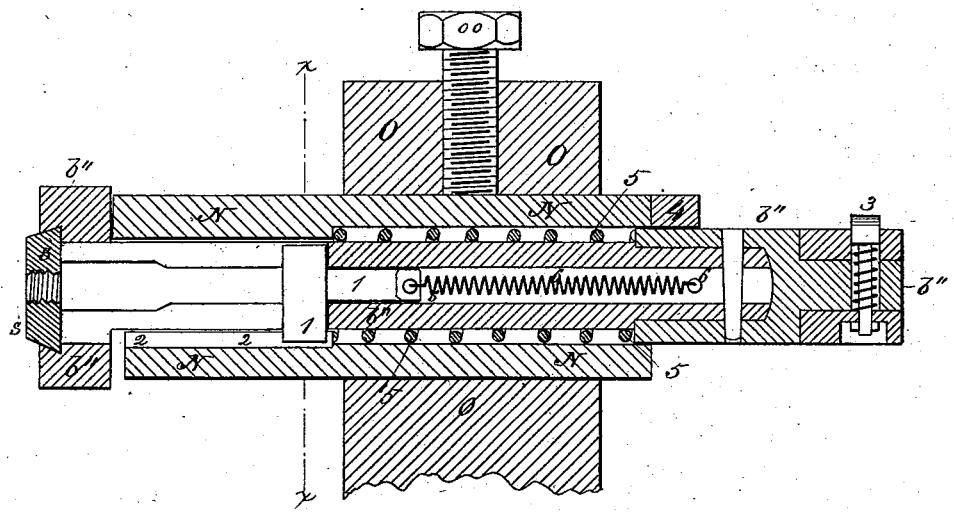
Fig. 27. Fig. 28.
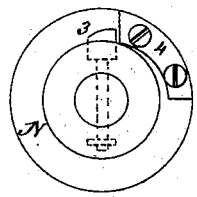 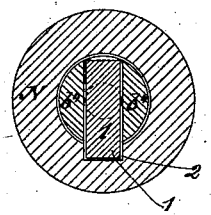
WITNESSES:
John E Kenion
Thos Houghton.
INVENTOR:
George Heyne
BY Mann
ATTORNEYS.

UNITED STATES PATENT OFFICE.

GEORG HEYNE, OF OFFENBACH-ON-THE-MAIN, GERMANY.

SCREW-MACHINE.

SPECIFICATION forming part of Letters Patent No. 289,655, dated December 4, 1883.

Application filed November 9, 1882. (No model.) Patented in Germany January 24, 1882, No. 19,366; in England January 27, 1882, No. 431; in Belgium January 28, 1882, No. 56,921, and in Austria-Hungary March 12, 1882, No. 8,424 and No. 3,995.

*To all whom it may concern:*

Be it known that I, GEORG HEYNE, of Offenbach-on-the-Main, Germany, have invented new and useful Improvements in Screw-Machines, of which the following is a specification.

The invention consists in various combinations of devices for holding, feeding, and cutting the rods or other pieces from which the articles are to be made, all as will be fully described and set forth hereinafter.

Reference is to be had to the accompanying drawings, forming a part of this specification, in which similar letters of reference indicate corresponding parts in all the figures.

Figure 1 is a plan view of my improved automatic lathe. Fig. 2 is an end elevation of the same. Fig. 3 is an elevation of the opposite end. Fig. 4 is a cross-sectional elevation of the same on the line $x'\ x'$, Fig. 1. Fig. 5 is a side view of the cam I. Fig. 6 is a side view of the cam K. Fig. 7 is a longitudinal sectional elevation through the central spindle of the machine. Fig. 8 is a cross-sectional elevation of the same on the line $x^2\ x^2$, Fig. 7. Fig. 9 is a cross-sectional elevation of the same on the line $x^3\ x^3$, Fig. 7. Fig. 10 is a cross-sectional elevation of the same on the line $x^4\ x^4$, Fig. 7. Fig. 11 is a cross-section on the line $x^5\ x^5$, Fig. 1. Fig. 12 is a diagram of the cam C. Fig. 13 is a diagram of the cam B. Fig. 14 is a diagram of the cam A. Fig. 15 is a diagram of the cam F. Fig. 16 is a diagram of the cam G. Fig. 17 is a diagram of the cam E. Fig. 18 is a diagram of the covering H' for the cam A. Fig. 19 is a diagram of the cam D. Figs. 20 and 21 are longitudinal sectional elevations of a modification of the chuck, showing the same in two different positions. Fig. 22 is a cross-sectional elevation of the same on the line $x^6\ x^6$, Figs. 20 and 21. Fig. 23 is a cross-sectional elevation of a modification of the slide-rest. Figs. 24 and 25 show plan views of the same. Fig. 26 is a longitudinal section of the head, socket, and bolt. Fig. 27 is an end elevation, and Fig. 28 is a section on line $x\ x$ of Fig. 26.

Two parallel horizontal shafts, D' D², are journaled in bearing-blocks L on a bed-plate, L³, and on one end of each of these shafts a worm-wheel, R', is rigidly mounted, the said worm-wheels being at corresponding ends of the shafts.

Upon the shaft D' four cams, A, B, C, and I, are mounted. Cam C has a groove, $c$, as shown in Fig. 12, and the cams A, B, and I are provided with the projections, respectively, $a^4$, $q$, and $u'$.

On the shaft D² five cams, D, E, F, G, and K, are mounted, and the cams E and G have grooves $e$ and $g$, respectively, as shown in Figs. 16 and 17, and the cams D, K, and F have projections, as shown.

Midway between the shafts D' D², but slightly elevated above the same, a tubular shaft, E', is journaled in bearings L' L' on the bed-plate L³. Three cone-pulleys, P P' P², are loosely mounted on the shaft E', and between the pulleys P' P² a square sleeve, W, is securely fitted on the shaft E'. On the other end of said shaft a chuck, Q, is mounted, which is longitudinally movable. At the end of the shaft E' on which the chuck Q is mounted the said shaft E' is provided with two slots, crossing each other, and each slot contains two wedge-shaped pieces, $z\ z'$, having their inclined faces together. The front part of the chuck is composed of a ring, Q', provided with thumb-screws $z^2$, for adjusting the wedge-shaped pieces $z'\ z'$, and within the said ring a cover or disk, $z^3$, is fixed, which is provided in its middle with an opening of the size of the hollow of the shaft E'. The rear part of the chuck is provided with an annular groove about one inch in depth and one and a quarter inch in width. Two rings or blocks, R and S, which are also mounted on the tubular shaft E', are grooved in a similar manner, for the purpose of moving them longitudinally on the said shaft. The rings R and S slide over two longitudinal slots cut in the shaft E', and two claws or arms, $k\ k$, pivoted to the ring S, are so arranged that when the ring R, which has a conical face, is pushed toward the ring S the free ends of the claws or arms $k\ k$ will be pressed into the slots in the shaft E'. A ring, T, is rigidly mounted on the shaft E', and to it are pivoted three levers, $l'$, to each of which a brake-block, $u$, is pivoted, which blocks have leather secured on the inner surfaces in some suitable manner. The ring V is longitudinally movable upon the shaft, and when its conical end is forced toward the levers l' the brake-pieces u are pressed firmly against the cylindrical hub of the cone-pulley P, and as the ring T is fixed upon the shaft the cone-pulley P is held securely with it, and the two will turn together.

On the sleeve W, and free to slide on the same, is mounted a ring, H, which is grooved in the same manner as the ring S. Upon the ring H, and also upon the inside faces of the pulleys P' P², catches $a$, $a'$, $a^2$, and $a^3$ are provided. The chuck Q and the rings or blocks R, S, V, and H, which are all provided with grooves, are connected, by means of the levers $y$, $y'$, $y^2$, $y^3$, and $y^4$, with the cams E, F, B, G, and C, respectively. The levers $y$, $y'$, $y^2$, $y^3$, and $y^4$ are forked at their upper ends, as shown in Fig. 11, and the ends of the prongs of the forks are provided with anti-friction rollers, fitting within the corresponding grooves of the several rings or blocks. Each lever also has a roller at the lower end, which runs against the projections and in the grooves of the cams. The said levers vibrate upon pivots $m$, which are attached to the bed-plate $L^3$ by arms $L^2$. If one of these levers is moved by the corresponding cam, this movement is transmitted to the corresponding ring or block on the shaft E'.

Upon the bed-plate $L^3$ there is a slide-rest, M, having spiral springs $e'$ beneath it, which draw it back. The slide M is operated by the cam D, working against the nose $i'$, and is drawn back by spiral springs, as shown in Fig. 7. The cams shown in Figs. 4 and 23 are not for forcing the cutter into the metal, but only for putting the cutter-lever in place. The rest M is then slid along, and the edge of the cutter turns down the metal to the extent to which the cutter has been lifted by the cam before the cutting began. During this time the pin of the cutter-lever arm travels along the surface of the cam as it turns. When the cutters are intended to cut into the metal from the side and not from the end, cams of a more gradual form are employed.

In Fig. 26 the head O is shown with its socket N, the spiral spring 5, and the slide-bolt $b''$, carrying the screw-cutter $s'$. Thus it will be seen that the bolt $b''$ is within socket N, which is held by the set-screws $o\,o$. The bolt carries the screw-cutter $s'$, and is operated by the arm $z$ until the cheeks $s\,s$ have obtained a good hold of the screw, so as to draw the bolt forward and cut the screw as it progresses. This goes on as long as key 1 slides in groove 2 of the socket N. When the key is drawn with the bolt so far that it comes out of the groove, the cheeks will cut no farther, but will rotate with the screw. When the reverse motion takes place, the bolt does not rotate, on account of spring-catch 3, which only allows it to rotate in one direction. As soon as the opposite motion begins, the spring-catch strikes against nose 4 and prevents the bolt from rotating. When the catch 3 rests against the nose 4, key 1, which is carried in a slot of the bolt, is in position to enter groove 2 of socket N. As soon as the finished screw is withdrawn from cheeks $s\,s$, the bolt is thrown back by spring 5. Thus the head of the bolt is taken out of the way of the other cutters, which now operate on the screw. Key 1 is attached to bolt by a spiral spring, 6. Thus, if anything should happen to prevent the key 1 from entering groove 2, the spring 6 will extend as spring 5 throws the bolt, and the bolt-head will rest against key 1, which, in its turn, will rest against the end of socket $h$. If the bolt $b''$ has been moved forward by the lever Z, the spring 6 will draw the bolt back as soon as the pressure from the lever Z ceases. On the fore part of the saddle or slide-rest M the arms $b\,b'$ are attached, as shown in Fig. 4, and, by means of holders, these arms carry the tools $g\,g'$. On the axle A', at right angles to the center spindle, two worms, $f$, are mounted, which have their threads cut in opposite directions, and which engage with the wheels R' R' on the shafts D' D², whereby the said wheels R' R' are caused to revolve in opposite directions. A cone-pulley, $P^3$, is mounted on the axle A'.

The cone-pulleys P, P', P², and P³ are driven from a common shaft by means of cords or thin leather belts. The belts upon the two pulleys P P' are crossed, so that the said pulleys will revolve in the reverse direction of the pulley P². The cone-pulley P is connected with a large pulley on the driving-shaft, and is caused to revolve much more rapidly than the pulleys P' P². The speed of the shaft E' is different from that of the shafts D' D².

The operation is as follows: A rod or piece of wire of which the screws are to be made is placed in the hollow shaft E'. The said wire must be perfectly straight and true, and the extra length outside of the machine must be suitably supported. The machine being set in motion, the projections on the cam F act on the lever $y'$ and move it to the left, whereby the ring R on the hollow spindle E' is moved to the right, its conical face passing between the levers $k\,k$ and forcing them outward, whereby their inner extremities are caused to grasp the wire $x$, which is in the said spindle. Then the lever $y^2$ is moved by the cam B, and thereby the ring S and the ring R, together with the wire $x$, held by the levers $k\,k$, are pressed forward a certain distance, which distance can be exactly regulated, according to the desired length of the screw, by adjusting or altering the position of the cam B on the shaft D'. When the lever $y^2$ has passed the projection $q$ of the cam B, Fig. 13, the wire $x$ has been pushed through the desired distance, and then the chuck Q is shifted from left to right by means of lever $y$, which is acted upon by the cam E, whereby the wedge-shaped pieces $z\,z$ are pressed firmly on the wire, as shown in Fig. 7, so that it can move neither forward nor backward nor turn independently of the shaft. By the shifting of the blocks R and S the levers $k\,k$ relinquish their hold on the wire, and the projection $v$ of the cam K now acts upon the rod $i'$ of the arm $b'$, Figs. 1 and 4, and thereby the cutter or tool $g'$ is brought to bear against the wire. The spindle $E'$ is set in motion by the pulley P only as the conical part of the ring V is pressed under the lever-arms $l'$ $l'$ of the brakes U. While the wire is being turned the ring H on the sleeve W stands midway between the wheels $P'$ $P^2$, and its catches do not come in contact with those of the wheels $P'$ $P^2$; but when the wire has been turned, as stated above, and the ring V is shifted from left to right by the cam G, Fig. 1, the brake $u$ is loosened and the wheel P revolves freely around the shaft. Then the ring H on the sleeve W is shifted from right to left by the cam C, so that the catch $a'$ of the ring H comes in contact with the catch $a$ of the wheel $P'$, and thereby the shaft $E'$ is set in motion, but slower than before, as the speed of the wheel $P'$ is not as great as that of the wheel P. The lever Z is pressed against the bolt $b''$ by the cam A, Fig. 1, which bolt $b''$ is in the socket N, whereby the screw-cutting die $s'$, which is placed at the fore part of the bolt, is brought up to the rotating wire. When two threads have been cut on the wire, the screw-cutting die attached to the bolt $b''$, which is movable in the socket N, and only held in position by means of a strong spiral spring, is moved forward until the screw is cut the required length. When this is completed, the spindle $E'$ will for a moment cease to work as the ring H is shifted from left to right by the cam C. By further shifting the ring H to the right the catch $a^2$ of the ring H comes in contact with the catch $a^3$ of the cone-pulley $P^2$, and the shaft $E'$ begins to rotate in the reverse direction, and the cut screw is thus drawn out of the screw-cutting die $s'$, permitting the bolt $b''$ to be drawn back by the spiral spring into the socket N. The projection $u'$ of the cam I now comes into contact with the rod $i$, Fig. 4, raises the arm $b$, and presses the cutter or tool $g$ against the wire, and thereby cuts the wire as the cutter is more forcibly brought in contact with the wire by the cam I. Then all parts return to the positions which they had at the beginning of the operation just described, and the said operation is repeated as long as there is a wire in the spindle E.

Figs. 20, 21, and 22 represent a modification of the above-described chuck. This chuck consists of the sleeve M', which is firmly attached to the shaft, and is provided with four slots in its face at right angles to each other. Each slot contains a jaw, $q'$, easily moving in the slot, and to each jaw a pin is attached, which rests on a spiral spring, $f'$. On the outer surface of the sleeve M' four pivot-rests, $h'$, are provided, on each of which a lever, $k'$, is pivoted. Behind the sleeve M' a sliding sleeve, R'', is mounted on the shaft, which sleeve is provided with an annular groove in its circumference. The said sleeve R'' is moved in the same manner as the sleeve R, previously described. In a groove, $r''$, in the circumference of the said sleeve the ends of the levers are fitted, as represented in Fig. 20. If the sleeve R'' is moved from the sleeve M', the bent ends of the levers $k'$ will be forced out of the groove above described, and the other ends of the said levers will be pressed down, and by means of the screws $s''$ force the jaws $q'$ together, which in turn hold the wire in the center of the shaft. When the sleeve R'' is reversely moved, the above-mentioned movement will be reversed, and the spiral springs $f'$, expanding, will withdraw the jaws $q'$, and thus liberate the wire.

The modifications represented in Figs. 23 to 25 consist in the introduction of a third tool-holder, $b^4$, which is attached by the axle $a^5$ to the front part of the slide-rest M in such a manner that the tool $s'''$ is in one and the same vertical plane as the tools $g$ and $g'$ on the tool-holders $b$ and $b'$ on the front of the slide-rest. The axle $a^5$ serves also as the axle for the tool-holder $b'$. In the same manner as the third tool-holder is introduced, a fourth can be applied on the other side of the slide-rest.

Having thus fully described my invention, I claim as new and desire to secure by Letters Patent—

1. The combination of the chuck Q, the conical ring R, the ring S, the jaws $k$ $k$, the cone-pulley P, the ring H, the lever $y^4$, the cam C, the ring T, the brakes $u$, the ring V, the lever $y^3$, and the cam G, as and for the purpose described.

2. The cam B, having projections $q$, the lever $y^2$, and the rings R and S, in combination with the levers $k$ $k$, whereby the wire may be moved a required distance, as described.

3. The combination, with the hollow spindle E', of the chuck Q, the conical ring R, the ring S, having levers $k$, the cone-pulley P, the shafts D' $D^2$, with cams fixed thereon, the lever Z, the slide-rest M, two or more cutting devices, the head O, the socket N, and the bolt $b''$, substantially as herein shown and described, and for the purpose set forth.

4. The combination, with the hollow spindle E', of the chuck Q, the conical ring R, the ring S, having levers $k$, the cone-pulley P, the ring T, the ring V, and the brake-pieces $u$, the shafts D' $D^2$, with cams fixed thereon, the lever Z, the slide-rest M, two or more cutting devices, the head O, the socket N, and the bolt $b''$, substantially as herein shown and described, and for the purpose set forth.

In testimony whereof I have signed my name to this specification in the presence of two subscribing witnesses.

GEORG HEYNE.

Witnesses:
 FRANZ HASSLACHER,
 FRIEDRICH JAEGER.